United States Patent [19]
Tominaga

[11] Patent Number: 5,855,187
[45] Date of Patent: Jan. 5, 1999

[54] BREEDING HOUSING FOR A SMALL PET ANIMAL SUCH AS A RODENT OR THE LIKE

[75] Inventor: Kazutoshi Tominaga, Higashiosakashi, Japan

[73] Assignee: Kabushiki Kaisha Tominaga Jyushi Kogyosho, Osaka, Japan

[21] Appl. No.: 869,851

[22] Filed: Jun. 5, 1997

[30] Foreign Application Priority Data

Aug. 22, 1996 [JP] Japan ..................... 8-221555

[51] Int. Cl.⁶ ..................................................... A01K 1/03
[52] U.S. Cl. ............................................. 119/452; 119/6.5
[58] Field of Search ........................... 119/6.5, 417, 421, 119/452

[56] References Cited

U.S. PATENT DOCUMENTS

| | | | |
|---|---|---|---|
| 2,080,160 | 5/1937 | Austin | 119/6.5 |
| 3,653,357 | 4/1972 | Sheidlower et al. | 119/6.5 |
| 5,054,427 | 10/1991 | Hoover | 119/452 |
| 5,664,525 | 9/1997 | Phillips et al. | 119/452 |

*Primary Examiner*—Robert P. Swiatek
*Attorney, Agent, or Firm*—Armstrong, Westerman, Hattori, McLeland & Naughton

[57] ABSTRACT

In a front-opened box-shaped main casing, an underground passage forming member is provided which has a front-opened underground passage portion formed like a nest-hole. A transparent front panel is detachably attached to a front opening of the main casing so as to close the front opening thereof as well as the front-opened underground passage portion. As a result, a small pet animal, such as a hamster, can be observed while it maintains a more natural life style.

6 Claims, 4 Drawing Sheets

BREEDING HOUSING FOR A SMALL PET ANIMAL SUCH AS A RODENT OR THE LIKE

FIELD OF TECHNOLOGY

This invention relates to a breeding housing for a small pet animal such as a rodent, i.e., a hamster, a mouse, a gerbil, a rabbit, or the like.

RELATED ARTS

Recently, hamsters, for example, have become increasingly popular small pet animals. As a breeding housing for a hamster, a cage or a molded plastic container has been commonly used. In the housing, a small house, an exercise wheel, a feeding dish, a water bottle, an excretion tray, or the like, are typically provided A hamster, for example, inherently has a natural characteristic, or habit, of not only acting on the ground but also making a nest-hole under the ground and inhabiting therein, i.e., sleeping, eating, excreting, and the like. Conventional breeding housings, however, provide a hamster with acting space on the ground to some degree, but cannot provide a hamster with a nest-hole. A small house placed upon the ground surface in a breeding housing has been used as a limited substitute for a nest-hole. However, such a small house cannot necessarily satisfy the habit mentioned above. Thus, a hamster often tries to dig into the bottom of the breeding housing.

In addition, a hamster typically spends a longer time within the house than outside of the house. Such a habitat prevents observation of its acts. Especially, a hamster spends most of the time in the house during the daytime because of its nocturnal habit. Thus, it is very difficult to observe their lovely behavior and/or sleeping style as long as they are in the house.

OBJECT OF THE INVENTION

An object of the present invention which was made—in part—to resolve the aforementioned problems is therefore to provide a breeding housing which has a better habitat in conformity to small pet animals such as rodents, or the like, and which can decrease their stress—by providing more natural living conditions—and allow us to observe their lovely behavior at any time.

Other objects and advantages of the present invention will become apparent from the description of the preferred embodiments, which may be modified in any manner without departing from the scope and spirit of the invention.

SUMMARY OF THE INVENTION

According to the present invention, a breeding housing for small pet animals such as rodents, or the like, includes a front-opened main casing, an underground passage forming means having a front-opened underground passage portion formed like a nest-hole to be placed in the main casing, and a transparent panel attached to an opening of the main casing so as to close the opening as well as the front-opened underground passage portion.

As the underground passage portion formed like a nest-hole is provided in the breeding housing, a hamster, for example, can enjoy a nest-hole life in the underground passage with less stress.

Because the front-opened underground passage portion is covered by a transparent front panel at the front, a hamster's lovely behavior and actions in the underground passage portion can be observed through the transparent front panel.

The transparent front panel may be detachably attached to the front of the main casing so as to close the front-opened underground passage portion formed like a nest-hole so that the underground passage portion can be easily cleaned by opening or removing the transparent panel.

Preferably, the underground passage forming means is provided with a top wall having an opening communicating with the underground passage portion so as to form a ground surface in the breeding housing. This structure can provide a more comfortable environment for a hamster because the hamster can spend time both in the underground passage formed below the top wall and on an open space formed above the top wall. Thus, the hamster's living behavior and actions in the underground passage portion and on the ground surface can be observed through the transparent panel.

In the upper central portion of the main casing, a flat-recess portion may preferably be formed so as to protrude horizontally and forwardly, and is designed to have a ventilating opening at its front end. A user can carry the main casing by using the flat-recess portion as a handle. Since the ventilating opening of the flat recess portion faces toward the front of the main casing, light is prevented from coming into the main casing through the ventilating opening, and the ventilating opening is hard to see from below, inside of the main casing. Therefore, a weak-sighted hamster is not inspired to escape from the main casing, thereby preventing the hamster from gnawing at the flat-recess portion.

The underground passage forming means may preferably be made of a molded plastic article including an inorganic powder filler. By using a molded plastic article, the underground passage forming means can be easily formed. By including an inorganic powder filler in the plastic, the underground forming passage can be as strong as necessary to avoid being gnawed away by a hamster.

On the upper portion and/or the side portion of the main casing, external pipe connecting portions may preferably be provided. By connecting an external pipe to the connecting portion, an external passage can be formed outside the main casing and also can be communicated with other breeding housings through such an external pipe. As a result, a hamster's living can easily be expanded.

The main casing may preferably be a thin square-shaped box (having a high height, a wide width and a narrow depth), and a foot which is larger than the depth of the main casing may be rotatably connected to the bottom portion of the main casing so that the foot can take a number of positions, i.e., a pulled out position and a drawn back position. In the pulled out position, the foot is perpendicular to the longitudinal direction of the main casing with both ends of the foot protruding from the front and rear edges of the main casing. In this position, the foot enables the main casing to stand stably. In the drawn back position, the foot is parallel to the longitudinal direction of the main casing with the foot drawn under the main casing. In this position, the breeding housing can be conveniently stored or carried while in a compact state.

DETAILED DESCRIPTION OF THE PREFERRED EMBODIMENTS

Preferred embodiments of a breeding housing for a small pet animal such as a rodent, or the like, according to the present invention, will now be described in detail, with reference to the accompanying drawings.

FIGS. 1–5 show a breeding housing 1 which is preferably used for a hamster. The housing 1 includes a main casing 2, an underground passage forming means 3 and a transparent front panel 4.

Figure 1:
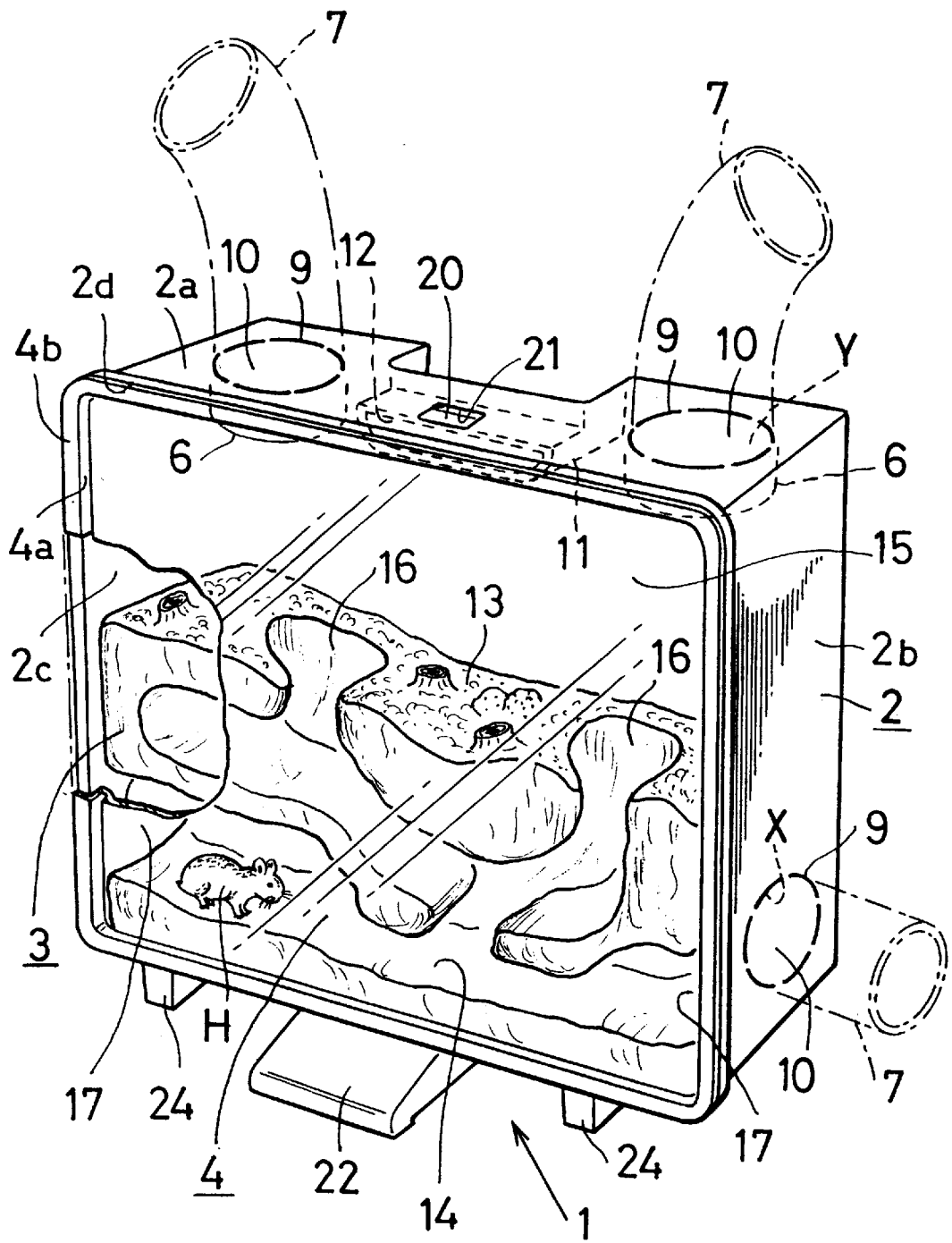
FIG. 1 shows a perspective view of a breeding housing of an embodiment according to the present invention.
Figure 2:
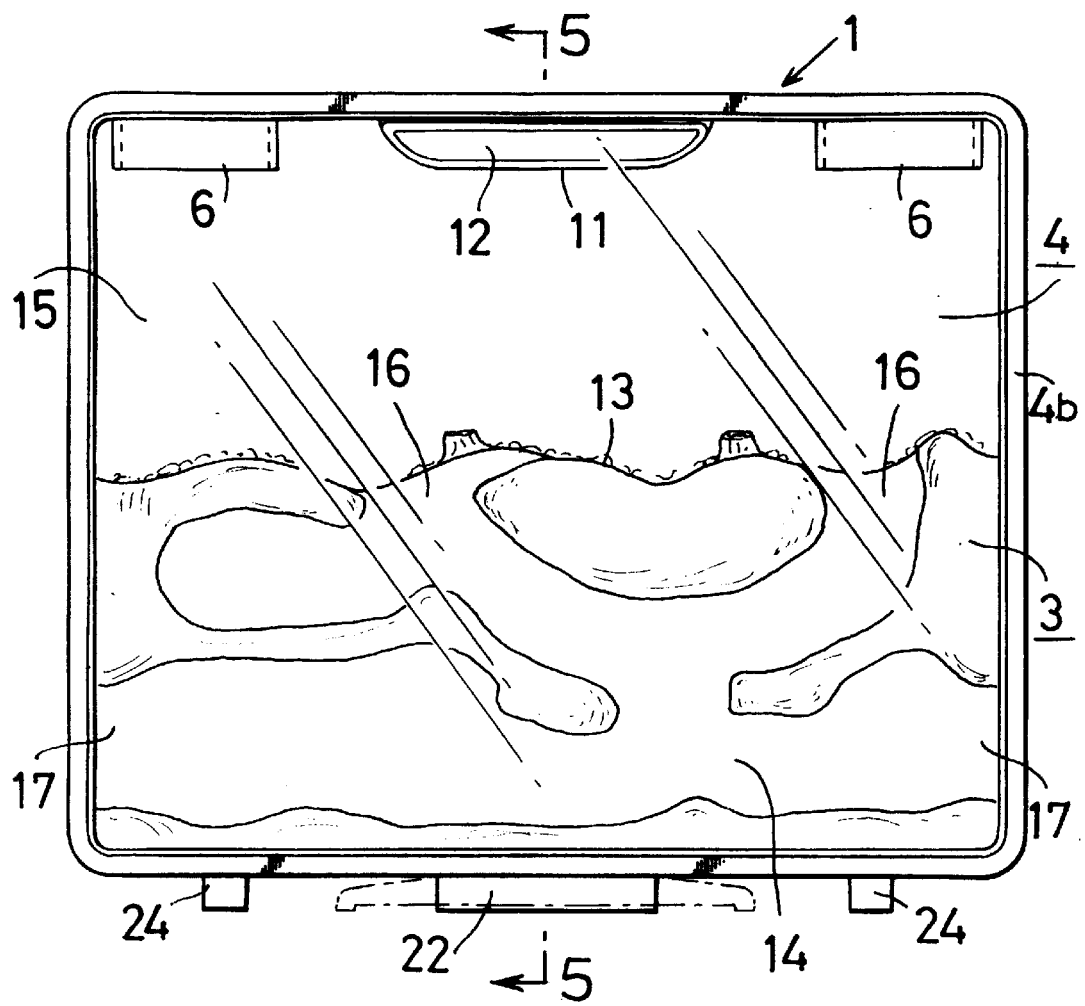
FIG. 2 shows a front view of the breeding housing shown in FIG. 1.
Figure 3:
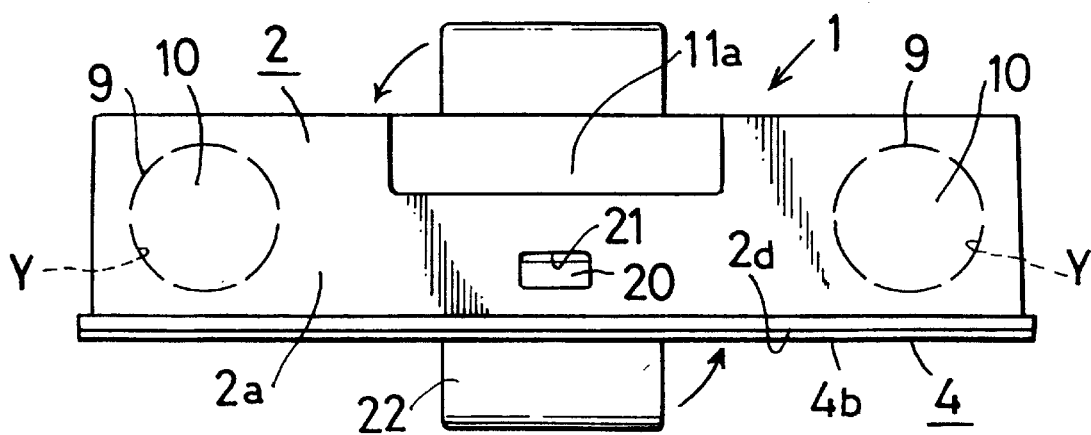
FIG. 3 shows a top view of the breeding housing shown in FIG. 1.
Figure 4:
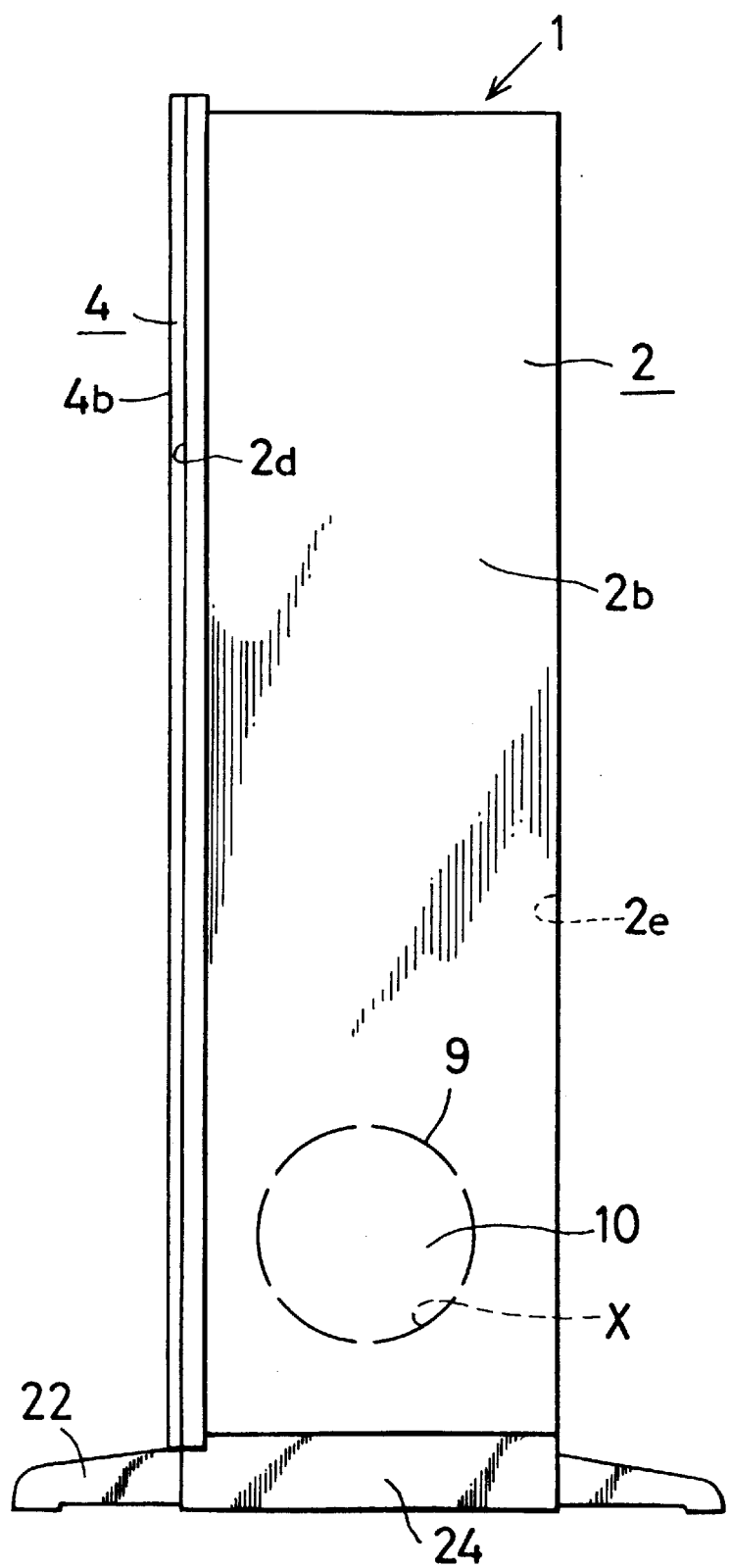
FIG. 4 shows a right side elevational view of the breeding housing shown in FIG. 1.

The main casing 2 is a molded plastic article of a given shape. The main casing 2 is a front-opened thin square-shaped box having a top wall 2a, a right side wall 2b, a left side wall 2c, a bottom wall 2d and a back wall 2e. As shown in FIG. 1, at the right and left sides of the top wall 2a and at a lower portion of the right and left side walls 2b, 2c, circular punch-out slots 9 are formed. By removing a circular portion 10 surrounded by the circular punch-out slots 9, a circular opening X communicating with the inside of the main casing 2 is formed. An end of an external passage formed by pipe 7 can then be inserted into the circular opening X so as to form an external passage outside the breeding housing 1. The punch-out slot 9 may be a circular slot or broken slits, or the like. A pair of short cylindrical portions 6 can be integrally formed around the circular punch-out slots 9 in the upper wall 2a so as to inwardly protrude into the main casing 2. By removing the circular portions 10 surrounded by the circular punch-out slots 9, circular openings Y are formed in the upper wall 2a such that the main casing 2 is opened through the cylindrical inner portions 6 and the circular openings Y.

Figure 5:
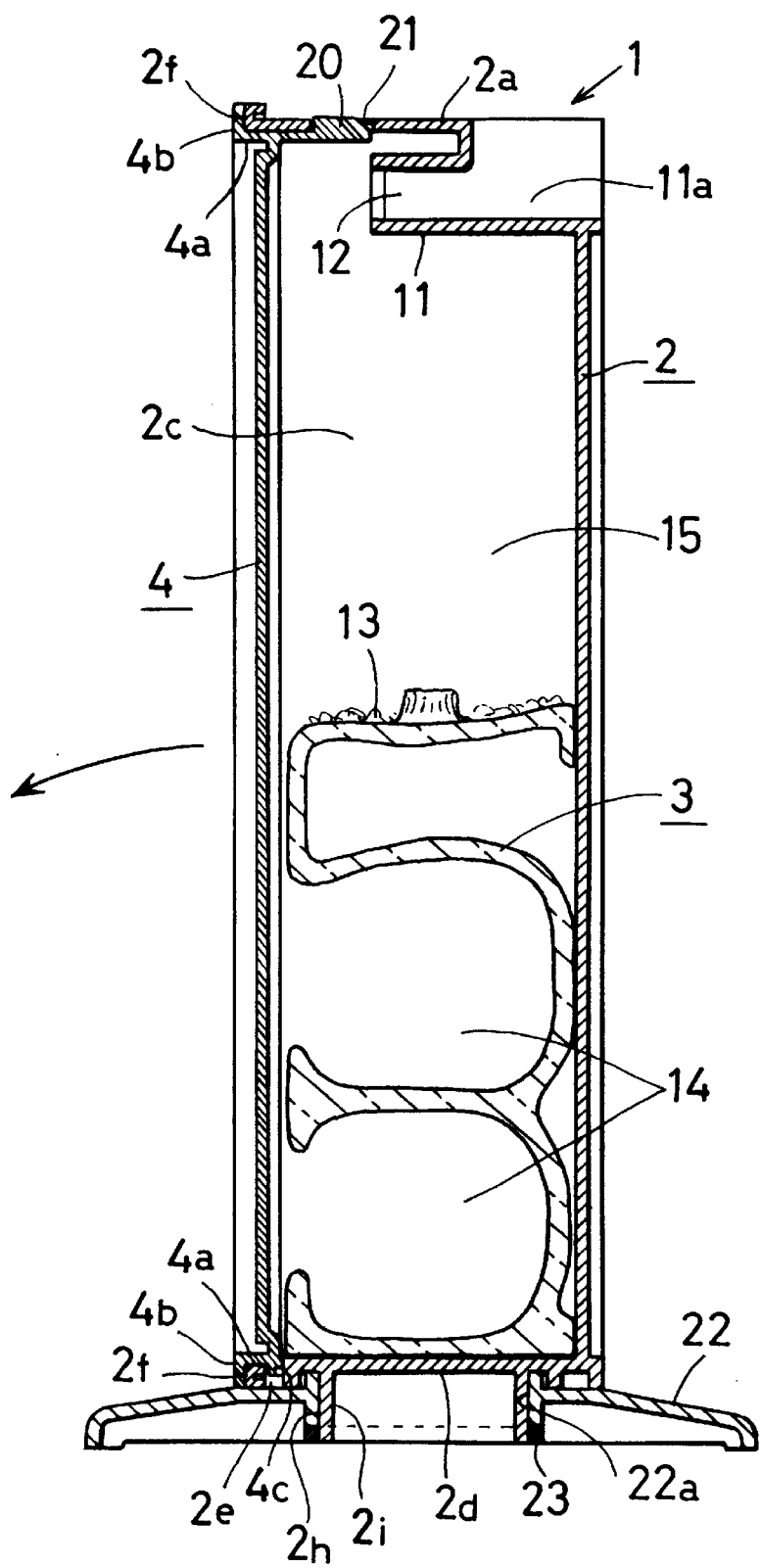
FIG. 5 shows a cross-sectional view taken along the line 5—5 in FIG. 2.

In the upper and central rear portion of the main casing 2, as shown in FIGS. 1 and 5, a flat-recess portion 11 is integrally formed so as to protrude forwardly and horizontally. The flat-recess portion 11 is designed such that a user can insert his or her fingers into the flat-recess portion 11 from behind of the main casing 2. The flat-recess portion 11 has a ventilating opening 12 at its front end which opens into the upper interior portion of the housing.

The underground passage forming means 3 is made of a molded plastic article which is preferably made of a plastic including inorganic powder filler. The plastic article may preferably be a molded article made of unsaturated polyester including sand powder. By using a molded plastic article to form the underground passage forming means 3, it can be easily formed to resemble an actual nest-hole. The use of a molded plastic article including an inorganic powder filler enhances the strength of the underground passage forming means 3 so as to prevent it from being gnawed by a hamster H.

The underground passage forming means 3 is fitted in the lower portion of the main casing 2 and is preferably connected thereto. Thus, the top surface of the underground passage forming means 3 forms a ground surface 13 and the space thereabove forms an open space 15.

The underground passage forming means 3 preferably has, on a front surface thereof, a front-opened underground passage portion 14 shaped like a nest-hole. The underground passage portion 14 preferably extends in a number of directions—upward, downward, right and left—so as to provide a plurality of rooms such as a storage room, an excretion room or some other rooms, taking into account the hamster's natural habits in a nest-hole. The underground passage portion 14 communicates with the open space 15 through opening 16 formed at the ground surface 13 so that a hamster H can go in and out the underground passage portion 14 through the openings 16. The underground passage portion 14 preferably has, at both sides of the underground passage forming means 3, other openings 17 so that the underground passage portion 14 can communicate with the outside of the main casing 2 through the circular openings X which can be formed by removing the circular portions 10 of the side walls 2b, 2c.

The front opened portion of the main casing 2 is closed by the transparent front panel 4. In this closed state, the panel 4 closes the front-opened underground passage portion 14 of the underground passage forming means 3 and the open space 15 above the underground passage forming means 3 in the main casing 2. Through the transparent front panel 4, the behavior of a hamster H in and between the underground passage portion 14 and the open space 15 can be easily observed. Thus, the transparent front panel 4 is preferably made of acrylic acid resin, or the like, having a higher transparency, and is a square plate having a size corresponding to the front-opened portion of the main casing 2. The transparent front panel 4 is detachably attached to the main casing 2.

The structure of the transparent front panel 4 will be now described in detail. As shown in FIG. 5, the transparent front panel 4 has a forwardly protruding peripheral portion 4a around the whole peripheral edge thereof, and also has a flange portion 4b protruding outwardly from the outside edge of the forwardly protruding peripheral portion 4a. The transparent front panel 4 is fitted in the front-opened portion of the main casing 2 so as to seal it with the flange portion 4b abutting the front peripheral edge 2f of the main casing 2.

The transparent front panel 4 has, at a lower edge thereof, hooking portions 4c downwardly protruding from the inside edge of the peripheral portion 4a—such as at certain spaced intervals along the length thereof. On the other hand, the main casing 2 has, at a front lower edge thereof, corresponding hooking recesses 2e for engaging the hooking portions 4c. By engaging the hooking portions 4c with the hooking recesses 2e, the transparent front panel 4 is supported with the main casing 2 so that the panel 4 can be pivoted 5 or lean forwardly about the lower edge thereof.

The transparent front panel 4 further has, at a longitudinal central portion of an upper edge thereof, a resilient locking arm 20 protruding inwardly with one end integrally connected thereto. An engaging opening 21 for engaging the locking arm 20 is formed in the corresponding portion of the top wall 2a such that the engaging opening 21 is located proximate to the front of the inserting opening 11a of the flat-recess portion 11. By rotating the transparent front panel 4 from a forwardly inclined standing state to a vertical standing state, the locking arm 20 is elastically bent downward by abutting the lower surface of the top wall 2a and then is engaged with the engaging opening 21 by elastically returning to its original horizontal position. Thus, the transparent front panel 4 is locked to the main casing 2 so as to close the front-opened portion of the main casing 2.

The transparent front panel 4 can be easily removed from the main casing 2 as follows. First, the locking arm 20 is pressed downward through the engaging opening 21 to release the engagement therewith. Then, the panel 4 is inclined forwardly and pulled out upwardly. Installation of the panel 4 to the main casing 2 can also be easily done by moving the panel 4 in a reverse manner.

The locking arm 20 can easily be released from the engaging opening 21 by pressing the locking arm 20 downward with one's thumb with the other fingers such as one's forefinger, middle finger, third finger, or the like, inserted into the flat-recess portion 11.

A foot 22 which is longer than the depth of the main casing 2 is rotatably attached to the bottom of the main casing 2 such that the foot 22 can take two positions, i.e., a pulled out position and a drawn back position. In the pulled out position, the foot is perpendicular to the longitudinal direction of the main casing 2 with both ends of the foot 22 protruding from the front and rear edges of the main casing 2. In this position, the foot 22 makes the main casing 2 stand stably. The foot 22 can be drawn under the main casing 2 by rotating it so that it is aligned with the longitudinal direction of the main casing 2. In the drawn back position, the breeding housing 1 can be compact when not in use.

As shown in FIG. 5, the foot 22 has, at a longitudinally central portion thereof, a cylindrical outer fitting portion 2$h$. The fitting portion 2$h$ is inserted in a cylindrical inner fitting portion 2$i$ which is downwardly protruding from the longitudinal central portion of the bottom wall so that the foot 22 is rotatably connected to the main casing 2.

The numeral 23 denotes a locking means fixed on the lowermost outer surface of the inner fitting portion 2$i$ for preventing the foot 22 from being pulled out. Also, the numeral 24 shown in FIG. 2 denotes a fixed foot which is provided at both right and left bottom sides of the main casing 2.

In the breeding housing 1 mentioned above, a hamster H can get into the nest-hole shaped underground passage portion 14, and thus can enjoy his inherent nest-hole life style. Further, a hamster H can go in and out of the underground passage portion 14 through the openings 16. Thus, a hamster H can also enjoy ground activities in the open space 15.

A hamster's lovely behavior or sleeping pose, or the like, can be observed through the transparent front panel 4 not only in the nest-hole shaped underground passage portion 14 but also in the open space 15. Especially, a hamster's nest-hole living can be zoologically observed in detail through the transparent front panel 4.

The underground passage portion 14 can be opened by removing the transparent front panel 4 from the main casing 2 so that the inside of the underground passage portion 14 can be cleaned easily. The transparent front panel 14 can easily be removed and reinstalled as mentioned above.

The breeding house 1 can easily be carried by one hand with fingers inserted in the flat-recess portion 11 as a handle. The inside air of the main casing 2 is always kept fresh and thus a hamster H doesn't suffer from a lack of oxygen because of the ventilating opening 12 of the flat-recess portion 11 as a handle. The ventilating opening 12 of the flat-recess portion 11 faces toward the front of the main casing 2 so that light is prevented from coming into the main casing 2 through the ventilating opening 12. Further, the ventilating opening 12 is hard to see from below, inside of the main casing 2. Therefore, a weak-sighted hamster H is not inspired to try to escape from the main casing 2, thereby preventing the hamster from gnawing at the flat-recess portion 11.

Circular openings X, Y can be used to expand hamster's living area by connecting an end of external passage formed by pipe 7 such that external passages are formed and the breeding housing 1 is communicated with another breeding housing.

Though the preferred embodiment of this invention is described above, this invention is not limited to the above embodiment and it allows various changes to be made. Though the above-mentioned embodiment shows the breeding housing 1 having an open space 15 in the upper portion of the main casing 2, a breeding housing may only have underground passages by using an underground passage forming means which fully occupies the main casing 2.

In the above-mentioned embodiment, though the underground passage forming means 3 has an underground passage portion 14 which is front-opened along its whole length, the underground passage forming means 3 may have a larger depth and may include—in part—non front-opened underground passage portions.

Furthermore, the underground passage forming means 3 has a depth corresponding to the depth of the main casing 2 so that the underground passage portion 14 is formed almost in the full depth of the main casing 2. An underground passage forming means may have a depth less than that of the main casing 2 and it may also be installed in the front half of the space of the main casing 2 so as to form a space between the underground passage forming means and the back wall 2$e$ of the main casing 2.

An additional shielding plate may also be detachably or openably provided in front of the transparent front panel 4 to cover the front-opened portion of the main casing 2 so as to make the front-opened underground passage portion 14 dark. The shielding plate can make the inside of the underground passage portion 14 dark when it is not being observed so that a hamster H can freely take a rest.

The above embodiments are directed to a breeding housing for a hamster H, but this invention can also be applied to other rodents such as a mouse, a gerbil, a squirrel, a rabbit, or the like. In the above-mentioned embodiments, the transparent front panel 4 is detachably installed to the main casing 2. Alternatively, the front panel 4 may be rotatably connected to the main casing 2 by way of a hinge, or the like, so as to be opened and closed easily.

As mentioned above, since a breeding housing for small pet animals such as rodents, or the like, according to the present invention, includes an underground passage forming means formed like a nest-hole, if a hamster is to be bred therein, a hamster can enjoy an inherent nest-hole life in the underground passage with less stress. The terminology "breeding" is intended to encompass all normal activities of a pet and is not used merely in a reproductive sense.

Furthermore, because the front-opened underground passage portion is covered by a transparent panel at the front, a hamster's lovely behavior or actions in the underground passage portion can be observed through the transparent front panel.

Because the transparent panel is detachably attached or is connected in an open-and-close manner in front of the main casing so as to close the front-opened underground passage portion formed like a nest-hole, the underground passage can be easily cleaned by opening or removing the transparent front panel.

Preferably, the underground passage forming means may be provided with a top wall having an opening communicating with the underground passage so as to form a ground surface in the breeding housing. This structure enables a more comfortable environment for a hamster because a hamster can spend time both in the underground passages below the top wall and on a ground surface above the top wall. Thus, a hamster's living behavior or actions in both the underground passages and on the ground can be observed through the transparent panel.

In the upper central portion of the main casing, a flat-recess portion may preferably be formed so as to protrude horizontally and forwardly, and can be designed to have a ventilating opening at its front end so as to ventilate therethrough. A user can carry the main casing by using the flat-recess portion as a handle. Since the ventilating opening of the flat-recess portion faces toward the front of the main casing, light is prevented from coming into the main casing through the ventilating opening. As a result, the ventilating opening is hard to see from inside the main casing. Therefore, a weak-sighted hamster is not inspired to escape from the main casing, thereby preventing him from biting the flat-recess portion.

The underground passage forming means may preferably be made of a molded plastic article including an inorganic powder filler. By using molded plastic articles, the underground passage forming article can be easily formed. By including an inorganic powder filler in the plastic, the underground forming passage will be strong enough to prevent it from being gnawed away by a hamster.

On the upper portion and/or on the side portion of the main casing, external pipe connecting portions may preferably be provided. By connecting an external pipe to the connecting portions, external passages can be formed outside the main casing and also can be communicated with the other breeding housings through such an external pipe. As a result, a hamster's living area can easily be expanded.

The main casing may preferably be a thin square-shaped box (having a high height, a wide width and a narrow depth) and a foot, which is longer than the depth of the main casing, may preferably be rotatably connected to the bottom portion of the main casing so that the foot can take two positions, i.e., a pulled out position and a drawn back position. In the pulled out position, the foot is perpendicular to the direction of the length of the main casing with both ends of the foot protruding from the front and rear edges of the main casing. In this position, the foot makes the main casing stand stably. In the drawn back position, the foot is parallel to the longitudinal direction of the main casing with the foot under the main casing. In this position, it is convenient to store the breeding housing or to carry it with a compact state.

The terms and expressions which have been employed herein are used as terms of description and not of limitation, and there is no intent, in the use of such terms and expressions, of excluding any equivalents of the features shown and described or portions thereof, but it should be recognized that various modifications are possible within the scope of the invention claimed.

What is claimed is:

1. A breeding housing for small pet animals such as a rodent comprising:

a main casing having a front opening;

an underground passage forming means made of a molded plastic article including inorganic powder filler and placed so as to form an open space above said underground passage forming means in said main casing, said underground passage forming means having a front-opened underground passage portion formed like a nest hole; and a transparent front panel detachably attached to said main casing so as to close the front opening as well as the front-opened underground passage portion, wherein said underground passage forming means is provided with a top wall having an opening communicating with the underground passage portion.

2. The breeding housing for small pet animals such as a rodent as recited in claim 1, wherein said main casing has an upper portion with a flat-recess portion as a handle, said flat-recess portion being formed to protrude horizontally and inwardly and having a ventilating opening at a front end of said flat-recess portion.

3. The breeding housing for small pet animals such as a rodent as recited in claim 1, wherein said main casing has a top wall with a connecting portion for connecting an external pipe.

4. The breeding housing for small pet animals such as a rodent as recited in claim 1, wherein said main casing has a side wall with a connecting portion for connecting an external pipe.

5. The breeding housing for small pet animals such as a rodent as recited in claim 1, wherein said main casing has a foot longer than a depth of said main casing, said foot being rotatably connected to a bottom portion of said main casing so that said foot has a pulled out position perpendicular to a length of said main casing and a drawn back position parallel to the length of said main casing.

6. A breeding housing for small pet animals such as a rodent, comprising:

a main casing having a front opening;

an underground passage forming means placed in said main casing, said underground passage forming means having a front-opened underground passage portion formed like a nest hole; and a transparent front panel detachably attached to an opening of said main casing so as to close the opening as well as the front-opened underground passage portion, wherein said main casing has, at an upper portion thereof, a flat-recess portion as a handle, said flat recess portion being formed to protrude horizontally and inwardly and having a ventilating opening at a front end thereof.

* * * * *